United States Patent [19]

Bouldin

[11] Patent Number: 4,463,089
[45] Date of Patent: Jul. 31, 1984

[54] REFLECTIVE OPTICAL DATA STORAGE AND LASER RECORDING MEDIUM

[75] Inventor: Eric W. Bouldin, Atherton, Calif.

[73] Assignee: Drexler Technology Corporation, Mountain View, Calif.

[21] Appl. No.: 451,605

[22] Filed: Dec. 20, 1982

[51] Int. Cl.[3] .................. G03C 5/54; G03C 1/76; G11C 13/04; G01D 15/10

[52] U.S. Cl. ..................... 430/617; 346/135.1; 346/76 L; 365/127; 369/275; 430/495; 430/964; 430/510; 430/616

[58] Field of Search ............... 250/316, 318; 365/126; 430/352, 207, 170, 217, 470; 525/275; 346/135.1

[56] References Cited

U.S. PATENT DOCUMENTS

| | | | |
|---|---|---|---|
| 3,889,272 | 6/1975 | Lou et al. | 346/1 |
| 4,269,917 | 5/1981 | Drexler et al. | 430/16 |
| 4,278,758 | 7/1981 | Drexler et al. | 430/616 |
| 4,284,716 | 8/1981 | Drexler et al. | 430/510 |
| 4,298,684 | 11/1981 | Bouldin et al. | 430/616 |
| 4,304,848 | 12/1981 | Bouldin et al. | 430/401 |
| 4,312,938 | 1/1982 | Drexler et al. | 430/496 |
| 4,314,260 | 2/1982 | Drexler | 346/76 L |
| 4,371,954 | 2/1983 | Cornet | 365/126 |
| 4,404,656 | 9/1983 | Cornet | 365/126 X |

OTHER PUBLICATIONS

*Chemistry, a Conceptual Approach,* 4th Ed., 1979, C. Mortimer, p. 637.

Grant Haist, *Modern Photographic Processing,* vol. 2, John Wiley & Sons, New York, 1979, pp. 122–127.

*Primary Examiner*—E. A. Goldberg
*Assistant Examiner*—Gerald E. Preston

[57] ABSTRACT

An improved reflective silver laser recording and data storage medium for direct read after writing, having a protective gold plating on the silver particles of the reflective surface. The gold plating increases the recording sensitivity resulting in higher contrast ratios for the recorded data. Increased contrast ratios between recorded and non-recorded reflective areas are obtained by the gold plating allowing lower laser energy for readout of recorded data. The reflective silver surface is plated with gold by an electroless ion displacement procedure.

16 Claims, 4 Drawing Figures

REFLECTIVE OPTICAL DATA STORAGE AND LASER RECORDING MEDIUM

DESCRIPTION

TECHNICAL FIELD

The present invention relates to laser recording media and more particularly to an improved reflective direct read-after-write silver optical laser recording and data storage medium.

BACKGROUND ART

Reflective direct read-after-write metal laser recording media have been used in the past for optical data storage and recording. Typically a thin metal film of tellurium, bismuth or selenium is vacuum sputtered or evaporated on a substrate thereby forming a laser recording medium in which holes representing data are ablated in the thin low-melting temperature metal surface by laser energy. Such data may be read by either transmitted or reflected light.

U.S. Pat. No. 4,269,917 (Bouldin and Drexler) a reflective laser recording and data storage medium is described having an electrically non-conductive surface layer of reflective silver particles in a low melting temperature colloid matrix. Such a dispersion of silver particles in a colloid such as gelatin results in a more sensitive laser recording medium than thin silver films since there is less loss of recording energy because of the lower thermal conductivity on the electrically non-conductive silver containing surface. Laser recording sensitivity may be further improved by the presence of an energy absorbing underlayer as taught by U.S. Pat. No. 4,312,938 (Drexler and Bouldin) which acts to concentrate depthwise the recording beam energy in the recording spot on the reflective surface thereby creating a melting of the underlying colloid causing a depression or pit in that area. Such depressions representing data would have decreased reflectivity compared to the upper unpitted reflective surface.

Laser recording media of the type using silver as the reflective metal are subject to corrosion if the atmosphere to which such media are exposed contains sulfide or chloride. Tarnishing of the silver to gray-black silver sulfide reduces the contrast ratio of the recorded data-containing low reflective areas to the reflective surface with a concomitant loss of data reading sensitivity. This decreaseed sensitivity requires higher reading laser power than normal.

Problems of noise may arise when the corrosion-caused silver salts are formed on the surface. Phase shifts and scattering of reflected light, distorted by surface dirt, cause apparent amplitude changes and reading errors.

The protection of the silver from corrosion must be by a means which will not result in a decrease in the reflectivity of the recording surface which would necessitate an increase in the laser power required to read the data after recording because of the diminished contrast ratio. A layer of smaller diameter metal grains on the surface, as taught by the anti-reflective layer of Lou et al., U.S. Pat. No. 3,889,272, would lessen the amount of laser energy required during recording by lessening the amount of reflection losses but would decrease the reflectivity of the medium necessitating higher laser energy for playback during reflective reading of the data. This might present problems for inadvertently recording depressions or pits with the read beam during readback of the data on the recording medium.

Any protective coating must not cause the recording medium to lose the advantage of the higher recording sensitivity. Non-conductivity of the recording surface in U.S. Pat. No. 4,269,917 allows lower laser recording energies than a conductive metal layer type of media and such nonconductivity must be preserved by any coating.

An object of the invention is to devise a protective coating for a reflective silver recording surface which would protect the reflective surface from atmospheric corrosion and extend the life of the product without causing loss of reflectivity or interfering significantly with electrical non-conductivity of the surface reflective silver particles.

Another object of the invention is to devise a protective coating which will maintain the reflectivity of the recorded surface at a relatively constant level and require less laser power for recording data pits.

DISCLOSURE OF INVENTION

The above objects have been met by the discovery that if the laser recording medium of U.S. Pat. No. 4,269,917 or a similar medium is plated by a second metal, specifically gold, both recording sensitivity and its related contrast are higher. The presence of the gold-plated silver particles prevents tarnishing of the silver while maintaining a high level of reflectivity of the surface. The improved recording sensitivity results in the formation of well defined holes with lower laser recording power. The improved contrast ratio allows lower laser energy levels for reading data. The replacement of the outer atomic thicknesses of the silver particles is brought about by an immersion or displacement plating in which an oxidation-reduction reaction between metallic silver and gold cations takes place. The metallic silver from the particle displaces the more noble gold from a solution of gold chloride and the reduced gold replaces the layer of silver oxidized on the silver particle. Since only a few atomic thicknesses of gold are formed, the cost is minimal.

The resulting article is a reflective metal laser recording medium having a surface layer with resistivity on the order of megohms consisting of reflective silver particles in a colloid matrix, having protective atomic thicknesses of gold on the surface of the silver particles.

BEST MODE FOR CARRYING OUT THE INVENTION

Figure 1:
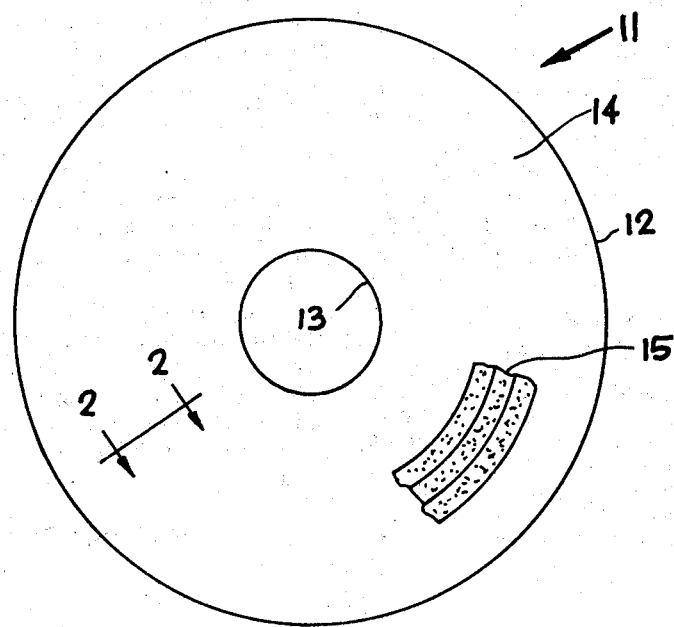
FIG. 1 is a top plan view of a recording disk for which the medium of the present invention may be used.

A reflective metallic laser recording medium of the present invention comprises a dispersion of reflective metal particles in a colloid matrix. A layer of reflective metal particles at the surface is composed of spherical silver particles plated with a few atomic thicknesses of a more noble metal such as gold, platinum or palladium. The presence of the noble metal coating is believed to be obtained by ionic displacement in which a more electronegative metal is reduced and is displaced from solution by the silver. This process is an electroless plating deposition in which gold or another metal replaces the outer silver atoms. In electroless plating, the more noble metal is replaced from solution by the silver in an oxidation-reduction reaction with the oxidized silver ions being replaced on the particles by the more noble reduced metal. Only the outside layer of silver metal on the particles is replaced and the self-sustaining reaction stops when the exposed surfaces of the silver particles are completely coated.

A. STARTING MATERIAL

The starting material for the present invention is a reflective metal laser recording medium having a surface layer of reflective silver particles dispersed in a colloid matrix. A medium of this type may be made by the methods disclosed in U.S. Pat. Nos. 4,269,917, 4,278,758, 4,284,716, 4,298,684, 4,304,848 and 4,314,260. The following examples are summaries of methods which may be used to form the starting material for the present invention:

EXAMPLE A (U.S. Pat. No. 4,314,260)

A shiny reflective surface may be produced by thermally converting a processed photographic silver-halide emulsion. The thermal conversion process also leads to a partial pyrolysis of the gelatin, creating free carbon which increases the absorption of the laser light thus converting more of the writing laser beam energy to heat energy thereby increasing the recording sensitivity of the media. The emulsion-coated substrate is processed to an opaque black coating, then heated in an oxygen containing environment until a shiny reflective component appears on the surface of the emulsion. Temperatures between 280° C. and 340° C. are preferred to produce the reflective coating during a time cycle on the order of one-half minute to 20 minutes. Heating methods include the use of a convention oven, a contacting hot source, or radiant heating. The resulting shiny reflective emulsion-coated transparent or absorptive substrate is a DRAW laser pyrographic reflective recording medium.

EXAMPLE B (U.S. Pat. No. 4,269,917)

First, a volume concentration gradient of silver precipitating nuclei is created at one surface of the emulsion by actinic radiation or other methods, with the gradient of decreasing concentration in the depthwise direction, and this is followed by a single step monobath silver transfer development process that is primarily a solution physical development process which is used to build up the volume concentration of silver at the surface containing the precipitating nuclei until the surface becomes reflective.

A principal step in the process is an exposure or surface activation of the area to be used for data recording or alternatively non-data recording, which affects mainly the silver-halide grains close to one of the surfaces of the emulsion. Such an exposure or activation creates a surface latent image having a depthwise exposure gradient, with a concentration of exposed silver halide which is greatest at the one surface and least in the interior of the emulsion.

EXAMPLE C (U.S. Pat. No. 4,278,758)

The first two steps are those given for Example B. Use of a silver-halide emulsion photoplate and a negative silver diffusion transfer photographic process leads to a well defined silver layer. This is followed by a third step of thermal annealing. The third principal step is a thermal annealing process typically for a few minutes at about 300° C., preferably in an oxygen containing atmosphere. This thermal annealing step apparently causes diffusion of silver particles to the reflective surface, slightly pyrolizes the gelatin thereby freeing some carbon, removes the water contained by the gelatin and transforms the physical structure of the gelatin from long helices to a shorter, random coil configuration typical of polymer materials. The thickness of the gelatin layer also shrinks in this process. The heating step leads to an increase in surface reflectivity apparently due to the increase in silver volume concentration at the surface. This step also increases the laser recording sensitivity, apparently because the carbon coated, light brown gelatin is more absorptive of the laser beam energy than is clear gelatin. Although this annealing step may be carried out in an inert atmosphere, the silver diffusion to the surface appears to be faster and more complete if carried out in an atmosphere containing oxygen.

The surface latent image may include images in the photographic recording sense or may cover the entire surface, but is always located primarily at a surface of a photographic emulsion, which also contains some unexposed silver halide, in the interior of the emulsion. Such a surface latent image may be made by light itself, i.e., by intentionally exposing one surface or the other of the photosensitive emulsion to light where data recording will occur, the remaining area being masked. Alternatively the surface treatment may be made by a surface activating chemical, namely a fogging agent, such as hydrazine or a borohydride salt such as potassium borohydride, which performs a surface latent image activation on silver-halide emulsions similar to a light exposure. Alternatively during their original manufacture of the silver-halide photographic plate or film a very thin gelatin layer containing silver-precipitating nuclei would be included at the surface distal to the substrate, which would be the basis for creating a reflective surface.

The second principal step of the process involves contacting the exposed or activated and unexposed silver halide with a monobath containing a silver-halide developing agent for developing the surface latent image created in the exposure or activation step. Simultaneously a silver-halide solvent in the monobath, preferably a soluble thiocyanate or ammonium hydroxide, reacts rapidly with unexposed and undeveloped silver halide to form soluble complexed silver ions which are transported by diffusion transfer to nuclei of the developing latent image or in the alternative case to the layer containing nuclei, where the silver in the complexed silver ions is precipitated in the presence of the silver halide developing agent. This process forms a reflective silver image which is a negative of the light exposed or surface activated latent image.

EXAMPLE D (U.S. Pat. No. 4,284,716)

The silver halide in a photosensitive emulsion of a photoplate or film may be exposed and developed into two optically contrasting layers by a series of steps so as to create a laser recording medium that is absorptive to laser beams both in the visible and near infrared. A partially transmissive mirror-like reflective upper layer is formed atop an absorptive underlayer, both of which absorb light energy in the ultraviolet, visible and infrared spectra.

The mirror-like reflective layer consists mainly of a relatively high volume concentration of non-filamentary silver particles and a lower concentration of filamentary silver particles supported in a matrix of gelatin. The dark underlayer consists mainly of a moderate volume concentration of filamentary silver particles supported in a matrix of gelatin. Other colloid matrices could be used to support the silver particles.

The two-layer medium is made as follows: The surface of a fine grained silver-halide emulsion photosensitive medium is exposed briefly to a low-to-moderate level of actinic radiation. This exposed silver halide is then developed to an optical density typically 0.05 to 2.0, as measured with red light of a photographic densitometer. This gelatin layer containing filamentary silver particles exhibits an optical density of typically 0.05 to 0.8 for a 3 micron emulsion and 0.1 to 1.5 for a 6 micron emulsion. After this initial processing step, the emulsion layer is gray in appearance, but a large amount of the silver halide in the emulsion remains unaltered. A very thin layer of unexposed silver halide at the surface of this partially developed emulsion layer is then chemically fogged to form a very dense layer of silver precipitating nuclei at that surface. The fogged medium is finally subjected to a negative silver diffusion transfer step wherein the silver halide in the emulsion is solvated to form soluble silver complexes. These silver complexes are precipitated on the silver precipitating nuclei to form a reflective layer comprising non-filamentary silver particles which aggregate with the filamentary silver. The degree of reflectivity of the surface may be adjusted over a range of values depending upon the ratios of the two types of silver. This same mechanism also causes some of the silver ion complex to precipitate on the filamentary silver in the absorptive underlayer increasing the optical density to red light of this already developed underlayer typically by at least a factor of two increase in light absorption.

The final result of these two exposure/development sequences is a reflective laser recording medium which is comprised of a very thin layer of reflective but non-electrically conducting reduced non-filamentary silver and a much smaller amount of filamentary silver, under which lies a highly absorptive layer consisting primarily of filamentary silver in a gelatin matrix. This absorptive underlayer typically has a final optical density to red light of between 0.2 and 3.0. The original silver-halide emulsion photosensitive medium which eventually results in the above-described reflective laser recording medium is usually coated on either a plastic or glass substrate. The reflective surface has a reflectivity to green light of 44% for a typical sample.

Laser recording on this double-layer medium can be made very efficient. The absorptive filamentary silver particles in the reflective layer can be increased until the minimum acceptable reflectivity is reached. These filamentary particles are absorptive over a very wide spectrum range from ultraviolet to near infrared, permitting a wide variety of lasers to be used for recording. Also, the light energy that is not absorbed by the reflective layer is almost entirely absorbed by the underlayer which causes a rise of temperature at the interface of the reflective layer and underlayer, thereby facilitating the melting of the reflecting layer.

EXAMPLE E (U.S. Pat. No. 4,304,848)

Actinic radiation is directed through light transmissive areas in an opaque master optical data storage medium forming latent images in an unexposed photosensitive medium. This exposure may be carried out when the master and photosensitive medium are in direct contact or spaced apart. The photosensitive medium should be a fine grained black and white silver-halide emulsion with a major surface parallel to the master. The actinic radiation which traverses the transmissive areas in the master creates latent images in the silver-halide emulsion disposed immediately opposite the transmissive areas. The photosensitive medium is removed and photographically developed so that the latent images become gray or black spots. However, the developed medium is not chemically fixed since the remaining silver halide will be used in subsequent processing steps. These absorptive spots precisely correspond to the transmissive areas in the master.

The surface of the photosensitive medium is then activated to create a latent image layer of silver precipitating nuclei. This activation may be either by chemical fogging or by exposure to light. Next, the areawise partially developed and surface fogged or actinic radiation exposed silver-halide emulsion is dipped into a monobath containing a silver-halide solvent and a silver-halide developing agent which slightly chemically develops the latent image layer of precipitating nuclei. Simultaneously the silver-halide solvent in the monobath reacts rapidly with unexposed and undeveloped silver halide to form soluble complexed silver ions which are transported by diffusion transfer to the developing latent image layer of silver neclei, where the silver in the complexed silver ions is precipitated on the partially chemically developed silver nuclei in the presence of the silver-halide developing agent acting as a reducing agent. The sizes of the silver nuclei are increased by this silver diffusion transfer or solution physical development step and since there is a high concentration of reflective non-filamentary silver particles, the surface takes on the appearance of high reflectivity. The adjacent black data areas remain gray or black. Since the exposure of the photosensitive medium through the transmissive master was a significant exposure and the chemical development which followed was essentially complete, there was negligible silver halide remaining in the gray or black regions. Thus, the latent image density of silver precipitating nuclei in the gray and black regions is low and there is little silver halide in these regions to create the silver ion complexes. Thus, these gray and black regions retain their low reflectivity. By these processes the transparent areas of the master disk correspond to the gray or black areas of the copy, which areas have reflctivities typically under 5%. The opaque areas of the master disk correspond to areas having reflectivities typically greater than 25% in the copy. Thus, the reflective contrast ratio of the master typically may exceed 5:1. The reflective surface is produced entirely by the silver contained within the silver halide of the emulsion of the photosensitive medium.

If it is desirable that the copy be read by transmitted light, the gray or black areas may be bleached by a standard silver bleach immediately after the initial chemical development step and before the surface fogging step. The resulting copy will have reflective and clear areas and could be read either in transmission or in reflection although the reflective contrast would not be as great as that of the previous case.

An advantage of the invention is that very high resolution reflective optical data storage copies of large diameter transmissive masters may be produced with commerically available silver-halide photosensitive materials disposed on glass or plastic substrates, which may be read either in reflection or transmission.

EXAMPLE F (U.S. Pat. No. 4,298,684)

The silver in a photosensitive, silver-halide emulsion of a photoplate or film having a nuclei layer therein can be brought to a surface of the emulsion to form a reflective laser recording and storage medium by a single top silver diffusion transfer negative photographic process. The nuclei layer should precipitate silver and have a gradient of decreasing concentration in the depthwise direction.

The nuclei always have a concentration which is greatest at the one surface of the emulsion and least in the interior of the emulsion. During the original manufacture of the silver-halide photographic plate or film a very thin gelatin layer containing silver-precipitating nuclei would be included at the surface distal to the substrate, which would be the basis for creating a reflective surface.

The principal step of the process involves contacting the exposed or activated and unexposed silver halide with a monobath containing a silver-halide developing agent for physically developing the nuclei. A silver-halide solvent in the monobath, preferably a soluble thiocyanate or ammonium hydroxide, reacts rapidly with unexposed and undeveloped silver-halide to form soluble complexed silver ions which are transported by diffusion transfer to the nuclei, where the silver in the complexed silver ions is precipitated in the presence of the silver halide developing agent. This process forms a reflective silver image.

B. THE GOLD COATING PROCESS

The starting materials described in Examples A, B, C, D, E or F are then subjected to an ionic displacement plating procedure by which a protective coating of gold is plated on the silver particles.

Ionic displacement of the silver by gold may be accomplished by the immersion of the reflective medium in a solution of neutral pH containing 0.03%-0.1% gold chloride, thiourea, and citric acid. Silver replaces gold in an oxidation reduction reaction in which the metallic silver on the surface of the silver particle passes into solution, replacing the more noble gold ions which in turn are reduced to metallic gold on the silver particles. The reaction is a self-sustaining one requiring no other reducing agent because of the higher oxidation potential of the silver in the electromotive series. The silver acts to reduce gold ions to a metal on the surface of the particles and the self-regulating reaction stops when there is no more exposed silver metal at the contacting surface of the reflective medium. The medium may be immersed in the electroless plating solution or may be exposed to the solution by a spray process. Immersion times of up to 3 minutes at 25° C. in the gold chloride electroless plating bath are sufficient to coat the silver particles. During the immersion the gold solution may diffuse into the colloid matrix and cause replacement of some of the silver below the surface. The reaction is self-limiting to any silver exposed to the gold solution and will cease when any exposed silver is uniformly coated with the gold.

The gold used for the electroless plating path is auric gold, the chloride of which is soluble in cold water. During the replacement of the silver with gold, three times as much silver is replaced by the reduced gold due to the difference of the oxidation states of +3 for the gold ion and +1 for the silver ion produced. The gold chloride-thiourea-citric acid bath for the electroless plating of gold is known in the art of photography for blue toning of black and white images and several variations of it do exist. Other baths using gold chloride in ammonium thiocyanate and sulfuric acid have also been used for blue toning photographic images. The solution used for gold plating the silver particles of the reflective laser recording medium should be of the self-limiting electroless type to insure that the electrical non-conductivity of the surface is retained after the plating. The electrical conductivity of the gold-coated surface increases over the non-coated surface, but the coated material does not have high conductivity. Laser recording experiments indicate that a surface resistance between two points, a few centimeters apart, greater than 0.1 megohms is necessary and greater than 1 megohm is desirable to obtain high recording sensitivity. The term electrically non-conductive shall apply to these conditions.

FIG. 1 shows a typical laser recording disk using the medium of the present invention. The disk 11 has an inner periphery 13 and an outer periphery 12. The interior of the inner periphery 13 is void so that a centering collar may be used to hold disk 11 on a spindle for high speed rotation. While the recording medium of the present invention is described as a disk, a disk configuration is not essential for operating of the recording medium. For example, the recording medium may be a flat sheet-like material which could be square and with a central hub rather than a hole. It could be a non-rotating rectangular plate. However, rotating disks are preferred for fast random access to medium amounts of data and non-rotating rectangular plates in stacks are preferred to provide intermediate speed random access to large amounts of data by mechanically selecting a plate and scanning it by mechanical and electro-optical means.

The recording field 14 is shown to have a plurality of concentric, circumferentially spaced paths 15 showing the gold plated silver particles on the reflective surface used for recording data by laser energy.

Figure 2:
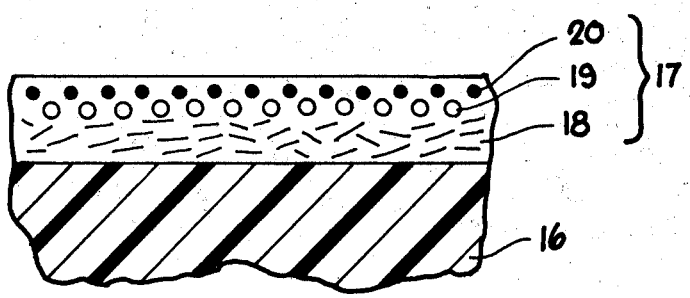
FIG. 2 is a side sectional view illustrating the recording medium of the present invention.

FIG. 2 is a representation of a type of structure formed according to the invention by gold plating a starting material similar to that of U.S. Pat. No. 4,284,716. FIG. 2 is a side sectional view of the recording medium of FIG. 1. A substrate 16 of glass or plastic or ceramic material supports a colloid matrix 17 containing three types of metal particles. On top of the substrate is a light absorptive underlayer 18 having predominately black filamentary silver as represented by the black dashes. Above the underlayer 18 is a layer 19 of predominately reflective spherical silver particles, as represented by the black circles. The uppermost layer 20 is made up of gold plated silver particles represented by the black dots. The gold will also plate onto any black filamentary silver at the exposed surface and will penetrate the colloid matrix to reach underlying silver particles if the immersion time in the gold-plating solution is extended. However such penetration into the colloid is not necessary for protection of the surface silver. The structure of the starting material with respect to the proportions of black filamentary silver particles and reflective spherical silver particles near the recording surface may be varied so as to obtain the optimum desired contrast ratio for the gold-plated recording medium.

The presence of the gold not only serves to protect the reflective surface from atmospheric tarnishing but also results in a superior article which yields a higher contrast ratio with laser power in the normal operating ranges. Because of this higher contrast ratio, it is possible to use lower laser energy levels when reading data pits and there are less problems of the possibility of accidentally recording data pits with the read beam on playback. The achievement of higher recording sensitivity and related higher contrast ratio by the gold plated silver reflecting laser recording medium of the present invention is an unexpected improvement over the unplated medium.

Figure 3:
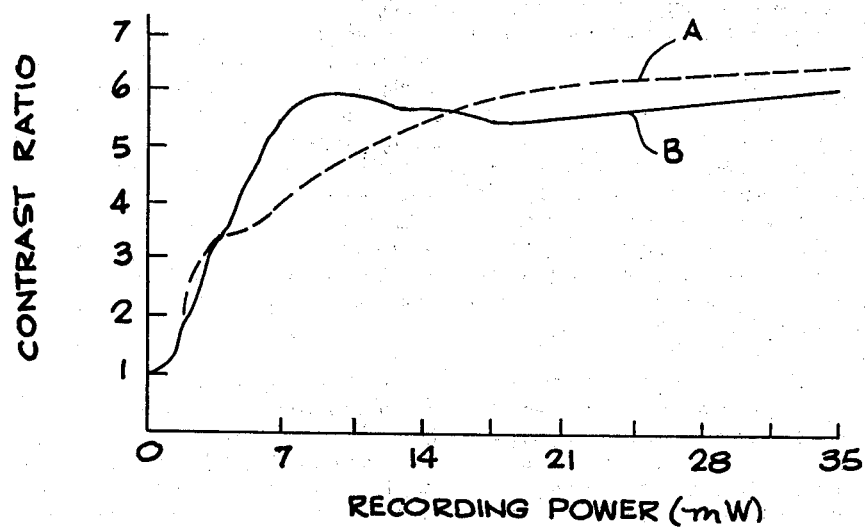
FIG. 3 is a plot of contrast ratio versus laser recording power for two materials during static conditions.
Figure 4:
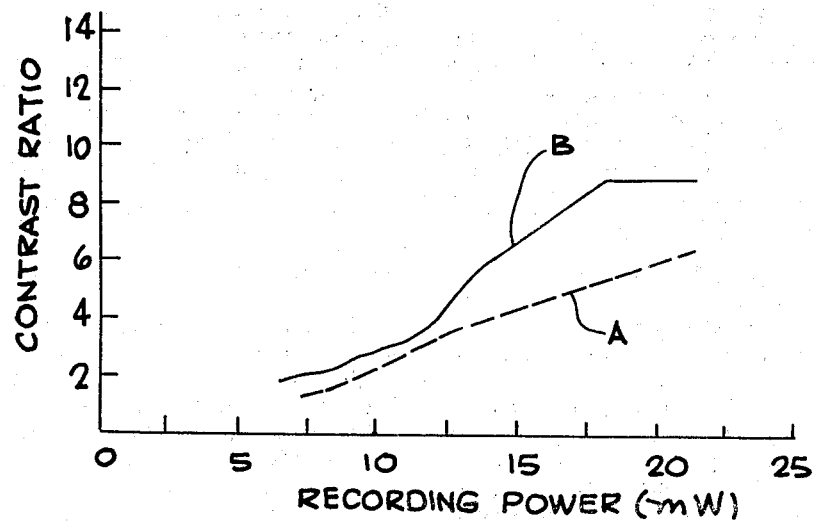
FIG. 4 is a plot of contrast ratio versus laser recording power for two materials during dynamic conditions.

FIG. 3 is a plot of the contrast ratios of reflectance at 514 nm wavelength from recorded pits and unrecorded reflective surface of the laser recording disk under static conditions. The laser recording power for the data pits ranged from 0 to 35 mW. The reflective recording medium made according to the method of U.S. Pat. No. 4,284,716 with an absorptive underlayer, shows an improved contrast ratio when gold-plated Plot B over the unplated control, Plot A, in the lower recording laser power ranges of 6–15 mW. This higher contrast ratio obtained for lower recording power allows the use of lower energy when reading data bits, lessening the chances of making error pits with the read beam on readback. As shown in FIG. 4, during dynamic testing of the recording disk medium at 2400 RPM rotation, the plated medium, Plot B, has improved contrast ratios at 514 nm between recorded and unrecorded areas contrast areas over the range from 7 to 22 nW recording power. The gold plated medium of the present invention, indicated by Plot B was made by immersing the medium of U.S. Pat. No. 4,284,716, as represented by Plot A, in a 0.03% gold chloride, thiourea and citric acid bath for 3 minutes at 25° C.

Table 1 shows that the percent reflectance of the gold plated medium is the same or improved over the unplated control material, A in the green, red and infrared regions after a 3-minute immersion time. The increase in optical density with immersion time, as shown in Table 2 for the green and red regions, without a loss of surface reflectivity, would increase recording sensitivity since more heat would be absorbed from the recording beam for each recording pulse.

TABLE 1

| | % REFLECTIVITY | | |
|---|---|---|---|
| Immersion Times | Green 514 nm | Red 633 nm | Infrared 830 nm |
| 0 control (A) | 55 | 63 | 45 |
| 1 min | 54 | 66 | 55 |
| 2 min | 55 | 68 | 62 |
| 3 min (B) | 53 | 66 | 64 |

TABLE 2

| | OPTICAL DENSITY | |
|---|---|---|
| Immersion Times | GREEN | RED |
| 0 (A) | 2.2 | 3.3 |
| 1 min | 2.6 | 3.6 |
| 2 min | 2.8 | 3.9 |
| 3 min (B) | 3.2 | 4.2 |

This invention, then, is an improved reflective metal laser recording medium having higher recording sensitivity and contrast ratios over the medium of the prior art, in addition to improve protection from atmospheric corrosion. This is achieved by the ionic displacement of a few atomic thicknesses of the surface silver of the silver particles by gold. Upon plating with gold, conductivity increases and may serve as a measure of plating. Other metals such as platinum and palladium may be plated on the silver by ionic displacement. Metals lower then silver on the electromotive series may also be plated on the silver from a bath containing a reducing agent.

I claim:

1. A reflective metal optical data storage and laser recording medium comprising
   a low melting colloid matrix layer supported on a substrate,
   an electrically non-conductive dispersion of reflective first metal particles in the matrix layer, with said paticles having a density greater at the surface distal to the substrate,
   said first metal particles at the surface distal to the substrate having coatings of a second metal.

2. The medium of claim 1 in which said reflective particles are silver particles, having a diameter greater than 20 angstroms and less than 350 angstroms.

3. The medium of claim 1 in which said second metal is more electro-negative than silver.

4. The medium of claim 3 in which said second metal is gold.

5. The medium of claim 1 in which said colloid matrix layer consists of an absorptive layer disposed on the substrate under the dispersion of metal particles, said absorptive layer having an optical density to red light between 0.2 and 3.0 and absorptive of visible and infrared light.

6. A reflective optical data storage and laser recording medium comprising
   a low melting colloid matrix layer supported on a substrate,
   an electrically non-conductive dispersion of reflective and non-reflective particles of a first metal in the matrix layer,
   said reflective particles of the first metal forming a reflective surface layer in said matrix layer, and a thin outer layer in said matrix, distal to the substrate, having reflective particles of the first metal plated with a second metal.

7. The data storage and recording medium of claim 6 wherein said first metal is silver.

8. The data storage and recording medium of claim 6 wherein said second metal is more electronegative than silver.

9. The data storage and recording medium of claim 6 wherein said coating is an ionic replacement coating.

10. A reflective optical data storage and laser recording medium comprising
    a low melting colloid matrix layer supported on a substrate,
    an electrically non-conductive dispersion of particles of a first metal in said matrix layer, said first metal particles forming a density gradient layer greater at the surface distal to the substrate, a portion of said first metal particles at the surface being reflective, said first metal particles on the surface distal to the substrate having coatings of a second metal.

11. The data storage and recording medium of claim 10 wherein said first metal is silver 12. The data storage and recording medium of claim 10 wherein said second metal is more electronegative than silver.

13. The data storage and recording medium of claim 10 wherein said second coating is an ionic replacement coating.

14. A reflective optical data storage and laser recording medium comprising a low melting colloid matrix layer supported on a substrate, said matrix layer having a first layer of essentially clear colloid proximate to the substrate, a second electrically non-conductive layer of reflective particles of a first metal dispersed in said matrix layer proximate to the first layer, a third electrically non-conductive layer of reflective particles of the first metal, said particles coated with a second metal, proximate to the second layer and distal to the substrate.

15. The medium of claim 1 wherein the first metal is silver.

16. The medium of claim 1 wherein the second metal is more electronegative than silver.

* * * * *

UNITED STATES PATENT AND TRADEMARK OFFICE
CERTIFICATE OF CORRECTION

PATENT NO. : 4,463,089
DATED : July 31, 1984
INVENTOR(S) : Bouldin, Eric W.

It is certified that error appears in the above—identified patent and that said Letters Patent is hereby corrected as shown below:

Column 1, line 68, "for" should read - -of- -.

Column 6, line 36, "neclei" should read - -nuclei- -.

Column 7, line 7, "commerically" should read - -commercially- -.

Column 7, line 15, the last word "top" should read - -step- -.

Column 10, line 4, "improve" should read - -improved- -.

Claim 1, line 7, "paticles" should read - -particles- -.

Signed and Sealed this

Fifth Day of August 1986

[SEAL]

Attest:

DONALD J. QUIGG

Attesting Officer

Commissioner of Patents and Trademarks